(12) United States Patent
Fanning

(10) Patent No.: US 7,017,008 B2
(45) Date of Patent: Mar. 21, 2006

(54) METHOD AND APPARATUS FOR OPTIMIZING DATA STREAMING IN A COMPUTER SYSTEM UTILIZING RANDOM ACCESS MEMORY IN A SYSTEM LOGIC DEVICE

(75) Inventor: Blaise B. Fanning, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 221 days.

(21) Appl. No.: 09/751,602

(22) Filed: Dec. 29, 2000

(65) Prior Publication Data

US 2002/0087796 A1  Jul. 4, 2002

(51) Int. Cl.
*G06F 12/00* (2006.01)
(52) U.S. Cl. .................... 711/133; 711/141; 711/159
(58) Field of Classification Search ............ 711/159, 711/141, 133
See application file for complete search history.

(56) References Cited

U.S. PATENT DOCUMENTS

| 4,197,580 | A | * | 4/1980 | Chang et al. |
| 4,414,644 | A | | 11/1983 | Tayler |
| 5,790,137 | A | | 8/1998 | Derby et al. |
| 6,092,151 | A | | 7/2000 | Park |
| 6,289,434 | B1 | * | 9/2001 | Roy ........................ 712/32 |

FOREIGN PATENT DOCUMENTS

| EP | 0 062 175 A2 | 10/1982 |
| EP | 0 262 301 A2 | 4/1988 |

* cited by examiner

*Primary Examiner*—Jack A. Lane
(74) *Attorney, Agent, or Firm*—Blakely, Sokoloff, Taylor & Zafman LLP

(57) ABSTRACT

One embodiment of an apparatus for optimizing data streaming in a computer system between a processor and a system component includes a cache in a system logic device that stores disposable information. The term "disposable information" is defined as information that is meant to be read by a system component only once. Once a particular cache entry containing disposable information is read by a system component, that cache entry may be overwritten. Because disposable information is meant to be read only once, there is no need for the cache to write the information to system memory before overwriting the cache entry.

17 Claims, 2 Drawing Sheets

METHOD AND APPARATUS FOR OPTIMIZING DATA STREAMING IN A COMPUTER SYSTEM UTILIZING RANDOM ACCESS MEMORY IN A SYSTEM LOGIC DEVICE

FIELD OF THE INVENTION

The present invention pertains to the field of computer systems. More particularly, this invention pertains to the field of optimizing data streaming through a system logic device.

BACKGROUND OF THE INVENTION

Desktop computer systems typically use a graphics controller to display 3D images on a monitor. The graphics controller receives instructions regarding what to draw by driver software running on a processor. The processor and the graphics controller are typically coupled together by a system logic device (often referred to as a "chipset"). For systems that are being used for computer-aided design or for 3D games, the command traffic between the processor and the graphics controller can be considerable. The communication paths between the processor and the graphics controller can often sustain substantially more command bandwidth than if the command traffic is routed through memory, since the memory system must sustain twice the bandwidth in order to transfer the same commands. This is because the commands must be written from the processor into memory and later read back from memory by the graphics controller.

One solution to the limited memory bandwidth problem would be to write command data directly from the processor to the graphics device, eliminating the writes and reads to and from system memory. However, when command data is written directly by the processor to the graphics controller, processor cycles can be lost if the aggregate buffering capacity of the graphics controller and system logic device is consumed. When this happens, the processor is forced to wait for buffer space to clear before it can proceed. Because the graphics driver may need to perform complex calculations and these calculations can be forced to wait for simple command write operations, a substantial waste of processing power is experienced.

If the amount of buffer space in the system logic device were increased, the processor would experience less waiting for buffer space to clear. The system logic device could include a substantial cache that may be used to buffer enough command data so that the commands may be read by the graphics controller directly from the system logic device. However, because the system logic device has no way of knowing whether the data written to the buffers will ever be needed again by the graphics controller or by some other system agent, this solution has the problem of requiring that all of the data written to the buffers also be written out to system memory, thereby negatively impacting overall computer system performance.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

One embodiment of an apparatus for optimizing data streaming in a computer system between a processor and a system component includes a cache in a system logic device that stores disposable information. The term "disposable information" as used herein is defined as information that is meant to be read by a system component only once. That is, "disposable information" does not need to be retained by the computer system once the information has been consumed by a system component. Once a particular cache entry containing disposable information is read by a system component, that cache entry may be overwritten. Because disposable information is meant to be read only once, there is no need for the cache to write the information to system memory before overwriting the cache entry, and system performance is thereby improved.

Figure 1:
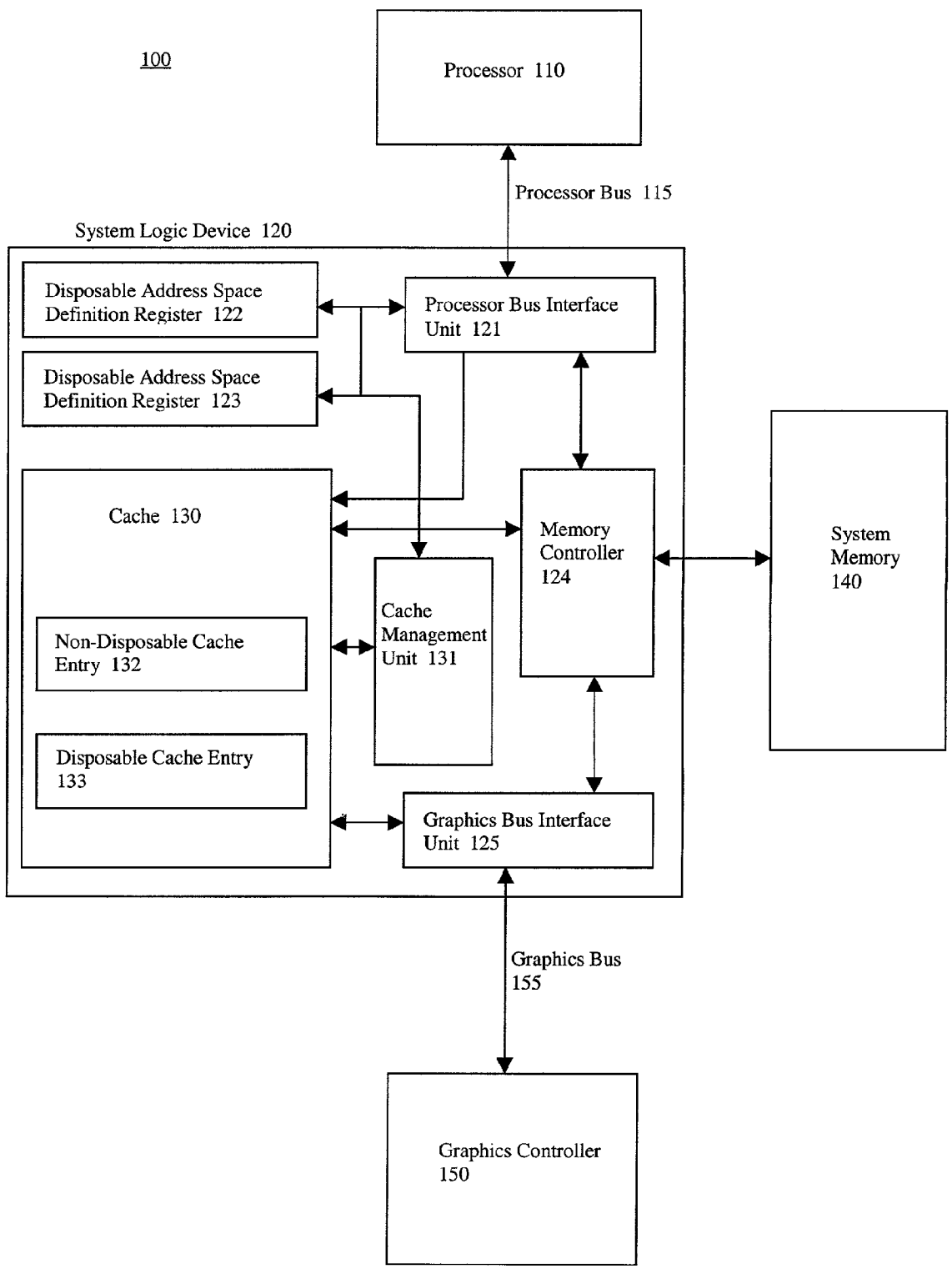
FIG. 1 is a block diagram of one embodiment of a system including a system logic device cache that stores disposable information.

FIG. 1 is a block diagram of a system 100 including an embodiment of a cache 130 embedded in a system logic device 120. The system logic device 120 is coupled to a processor 110 via a processor bus 115. The system logic device 120 is also coupled to a system memory 140 and a graphics controller 150. The graphics controller 150 is coupled to the system logic device 120 via a graphics bus 155. The graphics bus 155 may be an accelerated graphics port (AGP) bus or any other bus capable of coupling a graphics component to a system logic device.

The system logic device 120 includes a processor bus interface 121 that provides communication with the processor 110 over the processor bus 115. The system logic device 120 further includes a graphics bus interface unit 125 that provides communication with the graphics controller 150 over the graphics bus 155. The system logic device 120 asserts control over and communicates with the system memory 140 by way of a memory controller 124.

As previously mentioned, the system logic device 120 includes a cache 130. The cache 130 includes a number of entries. For this embodiment, each entry is capable of storing either disposable information or non-disposable information. A cache management unit 131 determines whether a particular entry contains disposable or non-disposable information. The cache size for this embodiment is approximately 64 kB, although embodiments are possible using other cache sizes.

For this discussion, the processor 110 is running a graphics driver that is sending a stream of command data to the graphics controller 150. The command data is delivered from the processor 110 to the system logic device 120 by way of the processor bus 115. The command data is received by the processor interface unit 121 and is placed in the cache 130. Included in the stream of command data is a segment of non-disposable information that is stored in a cache entry 132 (labeled as a non-disposable cache entry) and a segment of disposable information that is stored in a cache entry 133 (labeled as a disposable cache entry).

For this example embodiment, the cache management unit 131 determines whether a particular cache entry contains disposable data by comparing the address of that particular entry and with the addresses stored in a pair of disposable address space definition registers 122 and 123.

The contents of these registers define a disposable information address space. Any information having a destination address that falls within the range of addresses defined by the definition registers 122 and 123 is assumed to be disposable by the cache management unit 131. Other embodiments are possible using a transaction attribute that is communicated along with the disposable information across the processor bus 115. The attribute may be stored with the disposable information in the cache and the cache management unit can observe the attribute to determine whether a cache entry contains disposable information.

The graphics driver running on the processor 110 is able to know whether a particular command will need to be read more than once. If that particular command does not need to be read more than once, then that command is designated as disposable. The "disposable" designation is communicated to the system logic device 120 via one of the techniques described previously.

Once the non-disposable and disposable commands are stored in the cache 130, the commands are available to be read by the graphics controller 150. After the graphics controller 150 has read the contents of the disposable cache entry 133, the cache management unit 131 may allow that entry to be overwritten by other data without first writing the disposable information to the system memory 140. On the other hand, before the cache management unit 131 allows the non-disposable cache entry 132 to be overwritten, the non-disposable information must be written out to the system memory 140 so that the non-disposable information remains available to the graphics device 150 or other system component.

Although there is no requirement that disposable information be written to the system memory 140, some embodiments may allow the system logic device 120 to write disposable information to the system memory 140 in order to make room for more data in the cache 130 when the processor 110 would otherwise need to wait for cache space to become available.

The discussion above in connection with FIG. 1 refers to a processor streaming command data to a graphics controller. However, other embodiments are possible where data streaming is occurring between other system components.

Figure 2:
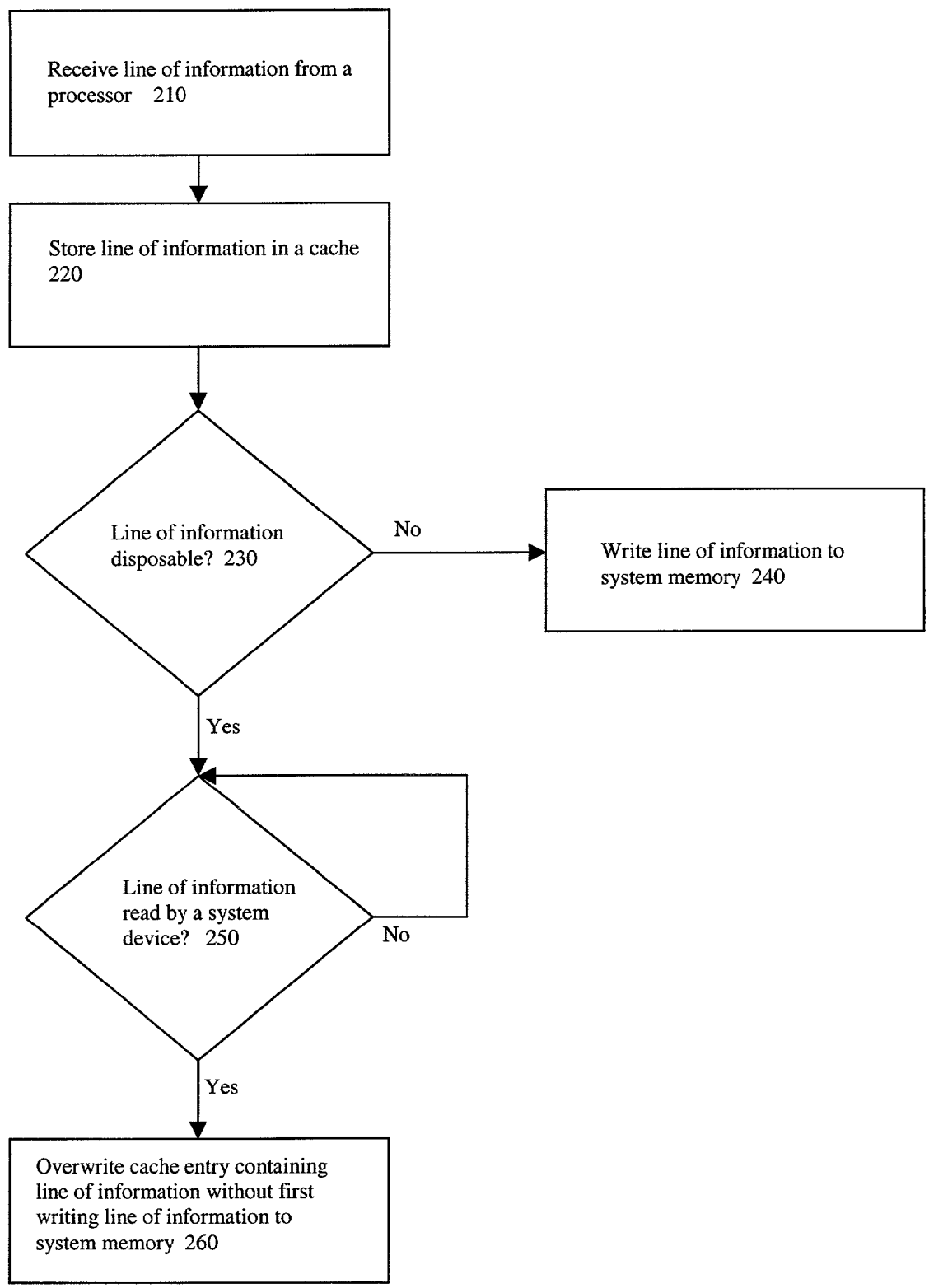
FIG. 2 is a flow diagram of one embodiment of a method for optimizing data streaming in a computer system utilizing random access memory in a system logic device.

FIG. 2 is a flow diagram of one embodiment of a method for optimizing data streaming in a computer system utilizing random access memory in a system logic device. At block 210, a line of information is received from a processor. The line of information is stored in a cache at block 220. At block 230, a determination is made as to whether the line of information is disposable. If the line of information is not disposable, then at block 240 the line of information is written to system memory. However, if the line of information is disposable, then a further determination is made at block 250 as to whether the line of information has been read by a system device. Once the line of information has been read by a system device, then at block 260 the cache entry containing the line of information is allowed to be overwritten without first writing the line of information to system memory.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. An apparatus comprising:
   a processor interface unit; and
   a cache to store information received from a processor coupled to the processor interface unit, the cache to store disposable information that may be overwritten without ever having delivered the disposable information to a system memory if the disposable information has been read at least once, the cache further including a cache management unit to determine whether a cache entry contains disposable information by comparing a disposable information cache entry address with a range of addresses that define a disposable information address space.

2. The apparatus of claim 1, the cache to further store non-disposable information.

3. The apparatus of claim 2, further comprising a bus interface unit to allow a device coupled to the bus interface unit to access the cache.

4. The apparatus of claim 3, the cache management unit to allow the cache entry to be overwritten once the device coupled to the bus interface unit reads the cache entry and if the cache management logic determines that the cache entry contains disposable information.

5. The apparatus of claim 4, further comprising a system memory controller.

6. The apparatus of claim 5, the cache management unit to cause the cache entry contents to be delivered to the system memory controller for delivery to a system memory if the cache management unit determines that the cache entry does not contain disposable information.

7. The apparatus of claim 6, further comprising at least one programmable register to store addresses that define a disposable address space.

8. A system, comprising:
   a processor; and
   a system logic device coupled to the processor, the system logic device including
      a processor interface unit, and
      a cache to store information received from a processor coupled to the processor interface unit, the cache to store disposable information that may be overwritten without ever having delivered the disposable information to a system memory if the disposable information has been read at least once, the cache further including a cache management unit to determine whether a cache entry contains disposable information by comparing a disposable information cache entry address with a range of addresses that define a disposable information address space.

9. The system of claim 8, the cache to further store non-disposable information.

10. The system of claim 9, the system logic device further including a bus interface unit.

11. The system of claim 10, further comprising a device coupled to the system logic device bus interface unit.

12. The system of claim 11, the cache management unit to allow the cache entry to be overwritten once the device coupled to the bus interface unit reads the cache entry and if the cache management logic determines that the cache entry contains disposable information.

13. The system of claim 12, the system logic device further including a system memory controller.

14. The system of claim 13, further comprising a system memory coupled to the system memory controller.

15. The system of claim 14, the cache management unit to cause the cache entry contents to be delivered to the system memory controller for delivery to the system memory if the cache management unit determines that the cache entry does not contain disposable information.

16. The system of claim 15, the system logic device further including at least one programmable register to store addresses that define a disposable address space.

17. A method, comprising:

receiving a line of information from a processor;

storing the line of information in a cache;

determining whether the line of information is disposable by comparing the address of the line of information with a range of addresses that defines a disposable information address space; and overwriting the line of information, if it is determined to be disposable, without ever having written the line of information to a system memory once the line of information has been read by a system device.

* * * * *